(12) United States Patent
Schrewe et al.

(10) Patent No.: US 11,397,123 B2
(45) Date of Patent: Jul. 26, 2022

(54) ENGINE WITH VALVE DEVICE AND TEST METHOD

(71) Applicant: Rolls-Royce Deutschland Ltd & Co KG, Blankenfelde-Mahlow (DE)

(72) Inventors: Sebastian Schrewe, Berlin (DE); Michael Friedrich, Schwielowsee (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 265 days.

(21) Appl. No.: 16/689,738

(22) Filed: Nov. 20, 2019

(65) Prior Publication Data

US 2020/0158589 A1    May 21, 2020

(30) Foreign Application Priority Data

Nov. 20, 2018    (DE) .................... 10 2018 219 884.5

(51) Int. Cl.
| | |
|---|---|
| *G01M 3/02* | (2006.01) |
| *G01N 1/20* | (2006.01) |
| *G01M 3/00* | (2006.01) |
| *G01F 1/44* | (2006.01) |

(52) U.S. Cl.
CPC ............ *G01M 3/025* (2013.01); *G01M 3/002* (2013.01); *G01N 1/2035* (2013.01); *G01F 1/44* (2013.01)

(58) Field of Classification Search
CPC .................................................. G01M 3/002
See application file for complete search history.

(56) References Cited

U.S. PATENT DOCUMENTS

| | | | | |
|---|---|---|---|---|
| 3,304,764 A | * | 2/1967 | Bracken | ................ G01M 3/002 73/46 |
| 4,922,233 A | * | 5/1990 | Twerdochlib | ............. F16T 1/48 340/606 |
| 2004/0225458 A1 | * | 11/2004 | Sherikar | .................... F17D 5/02 702/51 |
| 2010/0158068 A1 | * | 6/2010 | Monteiro | ............... B64D 13/00 374/4 |

(Continued)

FOREIGN PATENT DOCUMENTS

| | | | | |
|---|---|---|---|---|
| CN | 207454110 U | * | 6/2018 | |
| GB | 2541010 A | * | 2/2017 | ............ G01M 3/002 |
| GB | 2541010 A | | 2/2017 | |

OTHER PUBLICATIONS

English Translation of CN-207454110-U (Year: 2018).*
German Search Report dated May 30, 2020 from counterpart German Patent Application No. 10 2018 219 884.5.

*Primary Examiner* — Alexander A Mercado
(74) *Attorney, Agent, or Firm* — Shuttleworth & Ingersoll, PLC; Timothy J. Klima (57) ABSTRACT

The proposed solution concerns in particular an engine, with at least two valve devices for controlling bleed air in dependence on an operating state of the engine, the at least two valve devices in each case being adjustable between an open position and a closed position.
A flow space is provided for at least one fluid flow occurring in the flow space in dependence on a position of the at least two valve devices. Arranged in the flow space is at least one fluid sensor, by means of which at least one position of at least one of the at least two valve devices can be determined on the basis of the fluid in the flow space.

19 Claims, 8 Drawing Sheets

(56) References Cited

U.S. PATENT DOCUMENTS

| | | | |
|---|---|---|---|
| 2012/0018014 A1* | 1/2012 | Fernandes | F16L 23/006 137/561 A |
| 2012/0287960 A1* | 11/2012 | Thompson | B64D 13/00 374/4 |
| 2015/0275758 A1* | 10/2015 | Foutch | F02C 7/32 60/779 |
| 2015/0337679 A1* | 11/2015 | Everwyn | F01D 17/085 415/1 |
| 2016/0265685 A1* | 9/2016 | Hassell | E21D 23/006 |
| 2017/0067578 A1* | 3/2017 | Hoffman | F02C 9/18 |

* cited by examiner

ENGINE WITH VALVE DEVICE AND TEST METHOD

This application claims priority to German Patent Application DE102018219884.5 filed Nov. 20, 2018, the entirety of which is incorporated by reference herein.

The proposed solution concerns an engine with at least one valve device for controlling bleed air and a method for testing proper functioning of at least two valve devices on an engine.

It is also known to provide on engines, in particular on gas turbine engines for aircraft, valve devices for controlling bleed air, and consequently for controlling one or more bleed air flows. This usually involves are being bled out from the compressor of the engine, in order in this way to ensure a sufficient surge margin (for example for a low-pressure compressor) and/or to use the bleed air for cooling. In the latter case, the bleed air is for example often used for cooling turbine components of the engine that are subjected to high thermal loading. In the case of a turbofan engine, in particular to ensure a surge margin when starting the engine, often the bleed area is bled off into a secondary-flow duct of the engine, which is also referred to as a bypass duct.

In practice, the proper functioning of corresponding valve devices is of decisive importance. If, for example, a valve device provided on a compressor of the engine unintentionally opens at least partially, and stays permanently open, for example because of a fault in the electronics or thermal and/or mechanical damage to the valve device, this may result in an undesirable bleeding of large amounts of bleed air from the compressor. This in turn reduces the compressor outlet pressure that can be generated by the compressor, which results in insufficient cooling air flows and sealing air flows within the engine, and consequently an increased risk of failure for engine components.

Typically, temperature sensors are only used in the region of engine components that are subjected to thermal loading, in order to be able to detect a possibly critical rise in temperature in the vicinity of the respective engine components. However, this does not usually involve monitoring whether a temperature increase at the respective engine component is accompanied by a possible malfunctioning of a valve device by means of which a bleed air flow or a number of bleed air flows are controlled.

GB 2541010 A has at least already proposed detecting on the basis of sensors any damage in a fluid duct used for conducting bleed air for cooling. This involves a temperature sensor being arranged in a connecting duct between at least two fluid ducts conducting cooling bleed air. If one of the fluid ducts is damaged, a compensating flow is produced in the connecting duct, taking fluid at a higher temperature—in comparison with operation when there is no damage—past the temperature sensor. In this way, a sensor signal supplied by means of the temperature sensor can provide an indication if one of the fluid ducts is damaged. Using the temperature sensor to evaluate the extent to which under some circumstances a valve device on a compressor of the engine that controls the amount of fluid in the fluid ducts is operational is not envisaged by GB 2541010 A.

The proposed solution is consequently based on the object of providing an engine that is improved in this respect and also a possibility for easily testing the functional capability of at least one valve device provided for controlling bleed air.

This object is achieved both by an engine and by a test method according to the present disclosure.

According to a first aspect of the proposed solution, an engine is provided, comprising at least two valve devices for controlling bleed air in dependence on an operating state of the engine. In this case, the at least two valve devices are in each case adjustable between an open position and a closed position. A flow space is provided for at least one fluid flow occurring in the flow space in dependence on a position of the at least two valve devices. Arranged in the flow space is at least one fluid sensor, by means of which at least one position of at least one of the at least two valve devices can be determined on the basis of the fluid in the flow space.

Consequently, in dependence on a position of the at least two valve devices, fluid can flow into and/or through the flow space. In this way, at least one measured variable in the flow space that can be detected with the aid of the at least one fluid sensor changes in dependence on the different possible positions of the at least two valve devices. The flow space is in this case designed and arranged in such a way that it is possible by means of the at least one fluid sensor arranged therein to make inferences about the position of each of the at least two valve devices. The flow space is consequently fluidically connected to each of the at least two valve devices, so that a fluid flow generated in the flow space can be influenced by each of the at least two valve devices. The at least one fluid sensor in the flow space is consequently designed and intended to determine positions of the at least two valve devices on the basis of the flowing-in and/or flowing-through fluid in the flow space.

In principle, a valve device is intended to control bleed air or a bleed air flow in dependence on an operating state of the engine, so that bleed air can be generated by means of the position of at least one shut-off member of the valve device and possibly also the amount of bleed air can be controlled. This includes that a valve device is only adjustable discretely between a (completely) open position and a (completely) closed position. Such valve devices are used in practice for example on a high-pressure compressor of an engine. Also included, however, are valve devices which are adjustable in a stepped or stepless manner between an open position and a closed position, are variably opened only partially, and consequently can be adjusted into one or more intermediate positions between a completely open position and a completely closed position. Such valves devices are used in practice for example for controlling the amount of bleed air at a low-pressure compressor of an engine.

For controlling the bleed air, each valve device has at least one adjustably mounted shut-off member, for example in the form of a flap, in particular a displaceable flap, a plate, a piston or a ball.

In a configurational variant, the flow space is arranged and designed in such a way that the at least one fluid flow flows into and/or through the flow space when at least one of the at least two valve devices is at least partially open. In this case, use is then made for example of the fact that the at least one fluid sensor is reached by fluid which, as compared with a (reference) state in which all of the at least two valve devices are in a closed position, leads to significant and measurable changes in measuring variables characterizing the ambient conditions in the flow space. If, for example, at least one of the valve devices is in an at least partially open position, in a configurational variant at least one significantly changed fluid parameter, such as for example pressure (static or total pressure), temperature or flow rate, and/or a corresponding change of such a fluid parameter, can be detected with the aid of the at least one fluid sensor. At least one measured value detected with the aid of the fluid sensor is consequently indicative of the current position of the at least two valve devices.

In such a way it is possible for example, even by means of a single fluid sensor for a number of valve devices, to evaluate electronically which positions the valve devices are currently assuming. In this connection, sensor signals supplied by the fluid sensor can in particular be used effectively for testing the functional capability of the valve devices. If, for example, at an electronic control system there is a sensor signal that indicates at least one open valve device even though none of the valve devices is or has been activated to assume an open position, there is obviously a fault and at least one of the valve devices is erroneously open. In response to the detection of such a fault, it may accordingly be possible that an alarm signal can be generated.

The flow space is for example arranged and designed in such a way that at least two different fluid flows, which can be generated by means of different valve devices of the at least two valve devices, flow into and/or through the flow space. Depending on which of the at least two valve devices is for example in an open position, different fluid flows or differently combined fluid flows consequently reach the flow space, and thereby the at least one fluid sensor.

In principle, a flow of bleed air that is intended for an outflow opening, and can accordingly be conducted to this outflow opening, can be generated by means of a valve device. Such an outflow opening opens out for example into a secondary-flow duct or bypass duct of the engine or in a cooling air line. However, at least one additional fluid duct, which does not conduct the at least one fluid flow to the outflow opening, is then provided for conducting the at least one fluid flow to the flow space. The at least one flow space consequently admits for example a fluid flow from one valve device or a number of fluid flows from different valve devices that is or are not intended, or at least not primarily, for bleeding into a bypass duct of the engine or for cooling.

In a configurational variant, bleed air that is at least partially branched off from the flow in the direction of the outflow opening by means of the additional conducting duct can be used for generating the at least one fluid flow. The branched-off bleed air can be conducted via the additional conducting duct in the direction of the flow space having the at least one fluid sensor, but not to the outflow opening. The branched-off bleed air consequently serves solely, or at least primarily, for the purpose of being able electronically with the aid of the at least one fluid sensor to infer a position of the associated valve device, and consequently for example being able electronically to detect proper, fault-free functioning of the valve device(s).

The outflow opening may for example be provided at a housing of the valve device, in particular a so-called noise attenuator housing, at which the at least one additional conducting duct is also provided.

In a configurational variant, the flow space is provided at a crossing point of at least two fluid flows that can respectively be generated by means of one of the at least two valve devices. Consequently, for example, at least two fluid flows meet at the fluid sensor when there are at least two valve devices that are in each case at least partially open, each fluid flow being assigned precisely to one valve device. The at least one fluid sensor may in this case be arranged in particular at the crossing point of the fluid flows.

In a variant, the crossing point is in a duct connector, by which at least two fluid ducts that are respectively intended for conducting one of the fluid flows are connected to one another. In this case, the duct connector may have at least one additional outflow duct, which is connected to the at least two fluid ducts and by means of which at least some of the fluid conducted to the flow space can flow away out of the flow space. The duct connector consequently forms a physical connection between the individual fluid ducts, and may in this case also make possible the outflow of the fluid from the flow space (formed within the duct connector) by means of an outflow duct.

In an alternative configurational variant, the crossing point is between at least two outlet openings, which are respectively assigned to a fluid duct that is intended for conducting one of the fluid flows. At each of the at least two outlet openings, consequently, the respective fluid flow conducted in a conducting duct can emerge, and is directed in the direction of the crossing point. The fluid ducts are consequently not directly connected to one another, but only open out into the flow space having the at least one fluid sensor.

In a further alternative configurational variant, the at least one fluid sensor in the flow space is positioned at a distance from a connecting duct by which at least two fluid ducts that are respectively provided for conducting one of the fluid flows are connected to one another. The fluid sensor is consequently not at a crossing point of fluid flows of the valve devices that may lie in the connecting duct, but at a distance from it. Such an arrangement creates the possibility of using for a determination of a position of a valve device at least one measured variable that is measurably influenced by a fluid flow and can be detected by the fluid sensor, which does not necessarily consist of a fluid flow of one valve device or due to a combination of fluid flows of a number of (at least two) valve devices, but is only caused by at least one such fluid flow of a valve device.

In a configurational variant, the connecting duct is for example formed in the manner of a Venturi tube. The connecting duct is consequently for example constricted at the crossing point of at least two fluid flows, and in each case widens conically in the direction of a fluid duct. In a configurational variant, a design of the connecting duct in the manner of a Venturi tube allows the rise of the dynamic pressure or the fall of the static pressure that occurs as a result of the constriction of the connecting duct to be used to generate in a duct connected to the connecting duct—in the region of the constriction—a fluid flow that depends on the velocities and pressures of any fluid flows flowing in the direction of the connecting duct from the fluid ducts of the valve devices. The at least one fluid sensor may thus be arranged in such a way that, in dependence on the number of valve devices that are at least partially open, fluid flows past the fluid sensor in flow directions that are different from one another. For example, in principle a fluid flow may flow past the at least one fluid sensor along a first flow direction or a second flow direction, in particular along a second flow direction opposite to the first flow direction. Depending on whether only one valve device or two valve devices, the fluid ducts of which are connected to one another by means of the connecting duct, is or are at least partially open, a fluid flow then flows either along the first or the second flow direction past the fluid sensor that is arranged in the duct connected to the connecting duct. The different flow directions result in this case for example in different temperature and/or pressure conditions that can be measured by the fluid sensor, and consequently allow a determination with the aid of the at least one fluid sensor of in which positions the valve devices are.

Consequently, in a variant that is explained above, a flow space receiving the at least one fluid sensor is formed by the connected duct. The duct connected to the connecting duct may be for example an outflow duct, which opens out into a region in which low pressure, for example ambient pressure, prevails during the operation of the engine.

For testing the fault-free functioning, and consequently the functional capability, of a valve device, in a configurational variant the at least one fluid sensor is coupled to an electronic control system, by which an actuating signal that is independent of the fluid sensor and indicative of a position assumed or to be assumed of one of the at least two valve devices can be processed. An evaluation logic of the electronic control system can consequently evaluate on the basis of the actuating signal for an adjusting device and a sensor signal received from the fluid sensor whether the sensor signal of the at least one fluid sensor corresponds to one or more actuating signals for one or more valve devices. Consequently, in particular an electronic evaluation can be performed so as to ascertain whether an actuating signal and a sensor signal produces a discrepancy that suggests a possible malfunction of a valve device. Thus, the at least one actuating signal supplies information to and/or from the electronic control system concerning which position a valve device currently is intended to assume, or should assume, it being verifiable by means of the received sensor signals whether the respective position is also actually assumed. If, for example, an actuating signal for closing one or all of the valve devices is transmitted by means of the electronic control system to one or more actuating motors of the valve devices, and the at least one fluid sensor then however detects a fluid flow that can only occur when there is at least one open valve device, a malfunction of at least one valve device should be assumed and an alarm signal generated. Consequently, in combination with a sensor signal of the at least one fluid sensor, the actuating signal that is independent of the fluid sensor and is received or generated by the electronic control system provides an indication as to whether there is possibly an electronic or mechanical malfunction of a valve device, or even that it is damaged.

In a configurational variant, the at least two valve devices are intended for controlling bleed air at a compressor of the engine. In this case, it may for example be provided in particular that a first valve device and a second valve device of the at least two valve devices are assigned to different compressor stages of the compressor, so that by means of the at least one, in particular precisely one, fluid sensor in the flow space for valve devices of different compressor stages, the position of the valve devices can be determined. In an exemplary embodiment, for example, on the basis of the proposed solution, valve devices at a 4th and a 7th compressor stage of a compressor are tested for their proper functioning, or are monitored during the operation of the engine, with the aid of just one fluid sensor, for example comprising a temperature and/or pressure sensor.

According to a second aspect of the proposed solution, an engine is provided, comprising at least one valve device for controlling bleed air in dependence on an operating state of the engine. The at least one valve device is in this case adjustable between an open position and a closed position, and a flow of bleed air generated by means of the at least one valve device can be conducted to an outflow opening. In addition, a flow space is provided for at least one fluid flow, occurring in the flow space in dependence on a position of the at least one valve device, at least one additional fluid duct, which does not conduct the at least one fluid flow to the outflow opening, being provided for conducting the at least one fluid flow to the flow space. With the aid of at least one fluid sensor arranged in the flow space, at least one position of the at least one valve device can be determined on the basis of the fluid in the flow space.

According to this aspect of the proposed solution, the at least one fluid sensor is consequently also set up and intended for determining at least one position of the at least one valve device on the basis of the flowing-in and/or flowing-through fluid in the flow space. In the case of the second aspect, as a difference from the first aspect discussed above, it is not imperative that positions of at least two valve devices can be monitored with the aid of the at least one fluid sensor, although this is of course possible, and consequently a combination with the first aspect is entirely plausible. Rather, the second aspect of the proposed solution provides in particular that bleed air can be branched off by means of the additional conducting duct, in order thereby to generate at least one fluid flow in the direction of the flow space and not to the outflow opening.

Configurational variants based on this can be readily combined here with the variants explained above for the first aspect of the proposed solution.

Furthermore, a method for testing the proper functioning of at least two valve devices for controlling bleed air is provided. Here once again, a flow space is provided for at least one fluid flow, occurring in the flow space in dependence on a position of the at least one valve device. At least one sensor signal of a fluid sensor arranged in the flow space is used for testing the proper functioning, in order to determine on the basis of the fluid in the flow space at least one position of at least one of the at least two valve devices.

As part of a proposed test method, it may for example be provided in particular that the valve devices are activated one after the other for opening or closing, and then it is electronically tested on the basis of at least one sensor signal generated by the at least one fluid sensor whether in fact a proper adjustment that is reflected in the generated sensor signal by a characteristic change of a detected measured variable occurs.

A proposed engine according to the first or second aspect of the invention may be suitable here for carrying out a configurational variant of the proposed test method. Features and advantages explained above and below for configurational variants of a proposed engine consequently also apply to configurational variants of a proposed test method, and vice versa.

Figure 7:
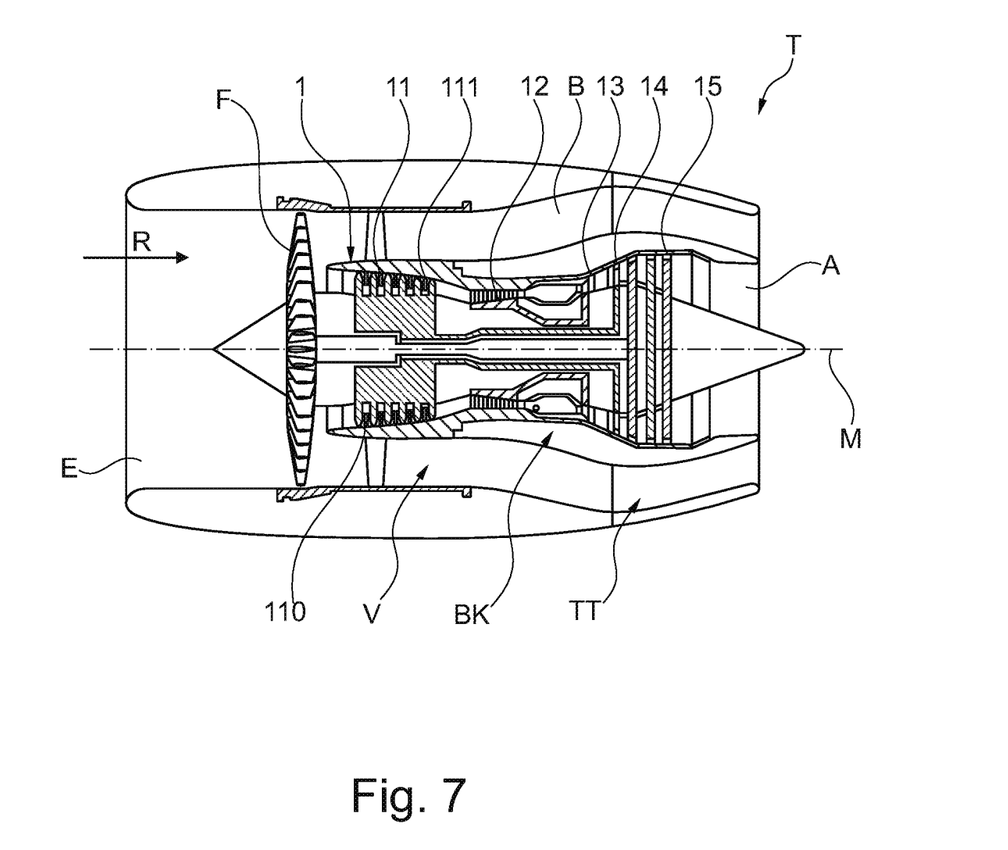
FIG. 7 shows schematically in a sectional representation a gas turbine engine in which at least one stator vane assembly according to the invention is used.

FIG. 7 shows schematically and in a sectional representation a (gas turbine) engine T in the form of a turbofan engine, in which the individual engine components are arranged one behind the other along a central axis or axis of rotation M. At an inlet or intake E of the engine T, air is drawn in along an inlet direction E by means of a fan F. This fan F is driven via a connecting shaft, which is set in rotation by a turbine TT. Here, the turbine TT adjoins a compressor V, which has for example a low-pressure compressor 11 and a high-pressure compressor 12, and possibly also a medium-pressure compressor. The fan F on the one hand feeds air to the compressor V and on the other hand, for generating the thrust, feeds air to a secondary-flow or bypass duct B. The air conveyed via the compressor V ultimately passes into a combustion chamber section BK, in which the driving energy for driving the turbine TT is generated. For this purpose, the turbine TT has a high-pressure turbine 13, a medium-pressure turbine 14 and a low-pressure turbine 15. The energy released during the combustion is used by the turbine TT to drive the fan F, in order then to generate the required thrust via the air conveyed into the bypass duct B. During this process, the air exits the bypass duct B in the region of an outlet A at the end of the engine T at which the exhaust gases flow out of the turbine TT to the outside. In this case, the outlet A usually has a thrust nozzle.

In principle, the fan F may also be coupled via a connecting shaft and an epicyclic planetary transmission to the low-pressure turbine 15, and be driven by the latter. It is furthermore also possible to provide other, differently designed gas turbine engines in which the proposed solution can be used. For example, such engines may have an alternative number of compressors and/or turbines and/or an alternative number of connecting shafts. As an example, the engine may have a split-flow nozzle, meaning that the flow through the bypass duct B has its own nozzle, which is separate from and situated radially outside the core engine nozzle. However, this is not limiting, and any aspect of the present disclosure may also apply to engines in which the flow through the bypass duct B and the flow through the core are mixed or combined before (or upstream of) a single nozzle, which may be referred to as a mixed-flow nozzle. One or both nozzles (whether mixed flow or split flow) may have a fixed or variable region. Whilst the described example relates to a turbofan engine, the proposed solution may be applied, for example, to any type of gas turbine engine, such as for example an open-rotor engine (in which the fan stage is not surrounded by an engine nacelle) or a turboprop engine.

In the variant of an engine T which is illustrated by way of example in the present case, the compressor V comprises a number of rows of rotor blades 110 situated axially in series and interposed rows of stator vanes 111 in the region of the low-pressure compressor 11. The rows of rotor blades 110, which rotate around the central axis M, and the rows of stationary stator vanes 111 are arranged alternately along the central axis M and accommodated in a (compressor) casing 1 of the compressor V. The individual stator vanes 111 are mounted adjustably on the single- or multi-part casing 1—generally in addition to radially inner mounting on the hub of the compressor V.

Figure 8:
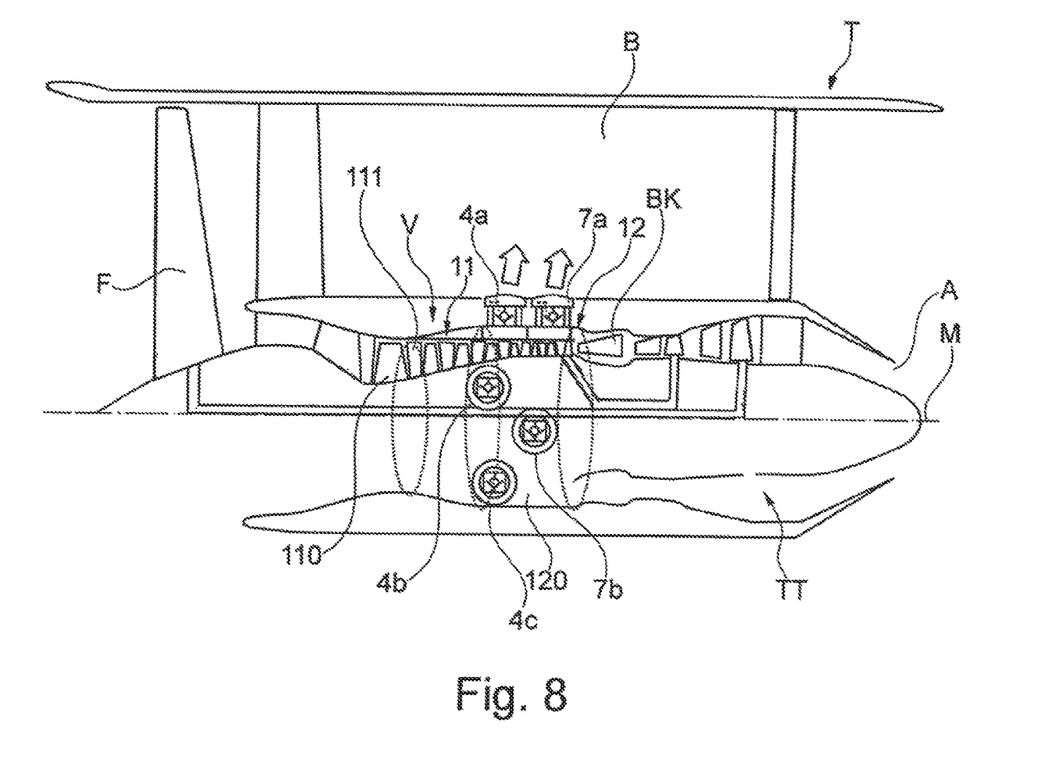
FIG. 8 shows in a sectional representation and schematically in the form of a detail the gas turbine engine from FIG. 7, illustrating by way of example valve devices provided on a compressor of the gas turbine engine in the form of bleed valves.

FIG. 8 illustrates by way of example possible positions of bleed valves on the compressor V of the engine T. In this case, bleed valves 4a, 4b and 4c are provided at a 4th compressor stage of the high-pressure compressor 12 and bleed valves 7a, 7b are provided at a 7th stage of the high-pressure compressor 12. The bleed valves 4a to 4c and 7a to 7c are in each case arranged distributed over the circumference and set up for bleeding bleed air into the bypass duct B in dependence on the current operating state of the engine T. For this, the individual bleed valves 4a to 4c and 7a, 7b are in each case adjustable, for example hydraulically or pneumatically, between an open position and a closed position. Here there are usually in the region of the high-pressure compressor 12 pneumatically adjustable bleed valves, which are often adjusted discretely between an open position and a closed position. For example, when starting the engine T, the bleed valves 4a to 4c and 7a, 7b are in an open position, and they are also opened in the case of accelerating or decelerating processes. However, bled-off air from the high-pressure compressor 12 or the low-pressure compressor 11 may of course also be used for providing cooling of any components of the turbine TT that are subjected to great thermal loading.

Figure 1:
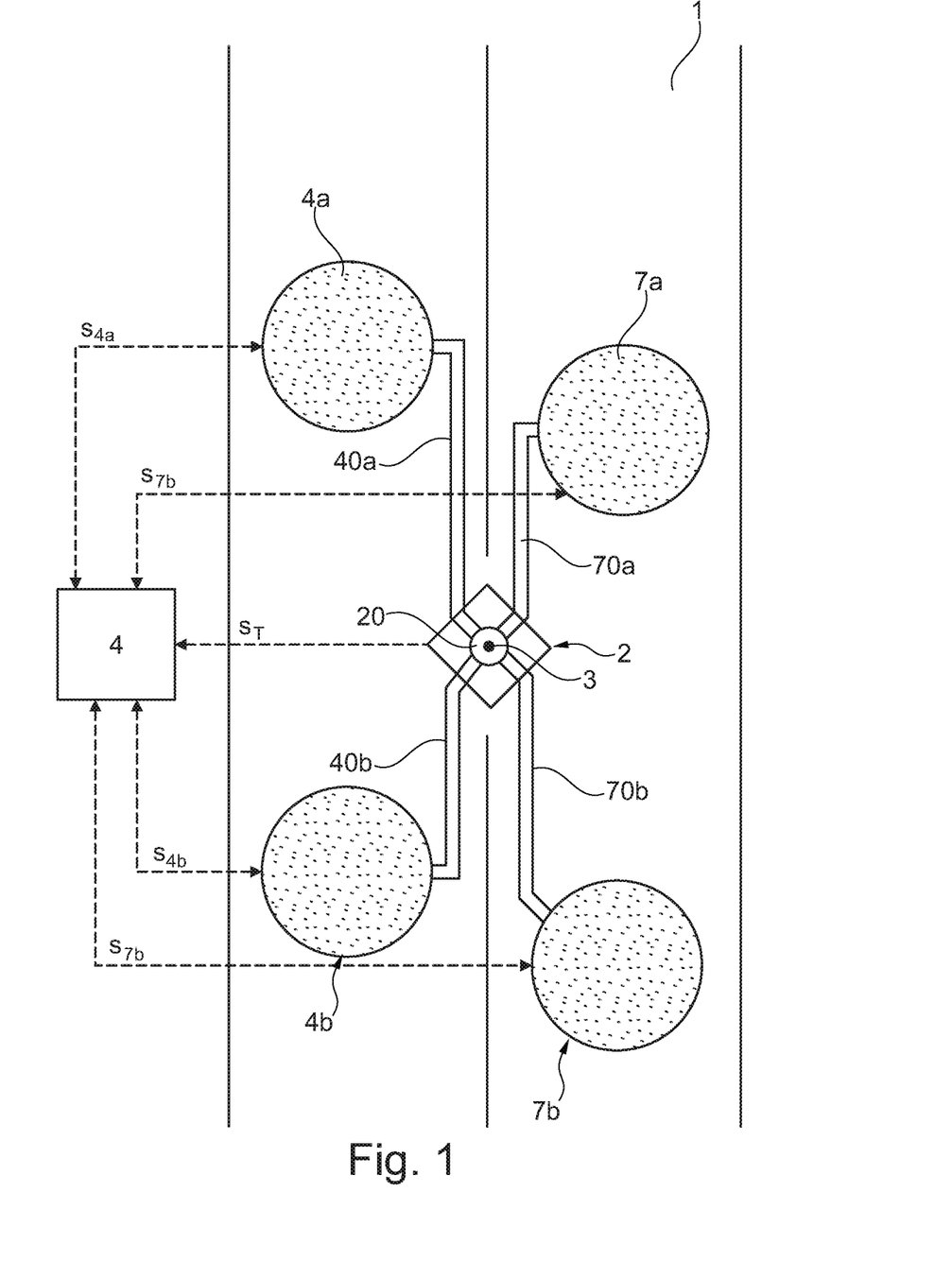
FIG. 1 shows schematically and in the form of a detail an arrangement of valve devices in a configurational variant of a proposed engine, in which valve devices of different compressor stages of a compressor of the engine have fluid ducts which are coupled to one another and are connected by means of a duct connector to a fluid sensor and an outflow duct, in order by means of the fluid sensor to infer different positions of the individual valve devices.

FIG. 1 shows schematically and in the form of a detail for a casing section 120 of the high-pressure compressor 12 of the engine from FIGS. 7 and 8 an arrangement of bleed valves 4a, 4b, 7a, 7b of different compressor stages of the high-pressure compressor 12, the proper functioning of which is monitored with the aid of a single fluid sensor, here in the form of a temperature sensor. For this, each bleed valve 4a, 4b, 7a, 7b is respectively assigned a fluid duct 40a, 40b, 70a or 70b, by means of which a fluid flow of branched-off bleed air is in each case conveyed in the direction of the temperature sensor 3 when the respective bleed valve 4a, 4b, 7a or 7b is open.

The individual fluid ducts 40a, 40b, 70a and 70b are connected to one another by means of a duct connector 2. This forms in its interior a flow space 20, into which the fluid flows from the individual fluid ducts 40a, 40b, 70a, 70b of the bleed valves 4a, 4b, 7a, 7b can flow. By means of an outflow duct of the duct connector 2, the branched-off bleed air can then flow out of the flow space 20.

Depending on whether one or more of the bleed valves 4a, 4b, 7a or 7b is (at least partially) open, ambient conditions in the common flow space 20 that can be detected by measuring instruments change as a result of the fluid flows generated. For example, a significant change of the temperature in the flow space 20 occurs, detectable by means of the temperature sensor 3. Such a temperature change or an absolute measured temperature then gives an indication of whether and possibly even which of the bleed valves 4a, 4b, 7a, 7b is open.

The temperature sensor 3 thereby generates and transmits a corresponding sensor signal $s_T$ to an electronic control system 4. This electronic control system 4 has an evaluation logic, which can determine on the basis of the sensor signal obtained, or here the temperature signal $s_T$, whether one or more of the bleed valves 4a, 4b, 7a, 7b is currently open. At the same time, at the electronic control unit 4 there are actuating signals $s_{4a}$, $s_{4b}$, $s_{7a}$, $s_{7b}$, which are indicative of whether—on the basis of the current operating state of the engine T—one or more of the bleed valves 4a, 4b, 7a, 7b is actually intended to be open or not. The actuating signals $s_{4a}$, $s_{4b}$, $s_{7a}$, $s_{7b}$ may in this case be signals for controlling an actuating motor of the respective bleed valve 4a, 4b, 7a, 7b, in particular for example if the bleed valves 4a, 4b, 7a, 7b are hydraulically adjustable. Alternatively, in particular in the case of pneumatically adjustable bleed valves 4a, 4b, 7a, 7b, the actuating signals $s_{4a}$, $s_{4b}$, $s_{7a}$, $s_{7b}$ may for example originate from a higher-level control, which signals on the basis of the current operating state of the engine T for the individual bleed valves 4a, 4b, 7a, 7b in which position they should be in each case. Accordingly, the sensor signal $s_T$ obtained can be used for carrying out a comparison as to whether an open position of one or more of the bleed valves 4a, 4b, 7a or 7b measured thereby is actually intended or there is possibly an electronic and/or mechanical malfunction, as a result of which one or more of the bleed valves 4a, 4b, 7a, 7b has been incorrectly opened or remains open.

Figure 2:
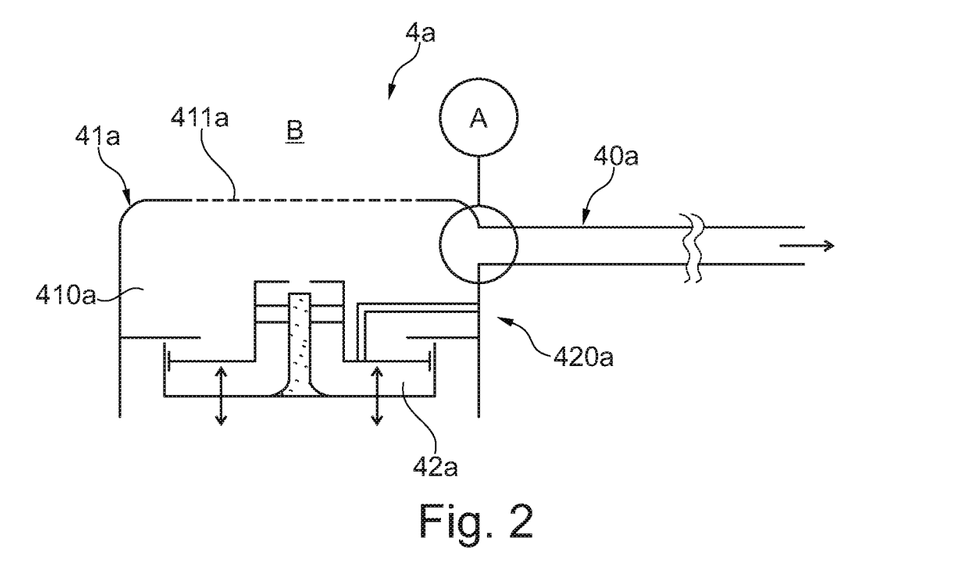
FIG. 2 shows in a sectional representation and in the form of a detail one of the valve devices from FIG. 1 with a valve housing or noise attenuator housing.
Figure 2A:
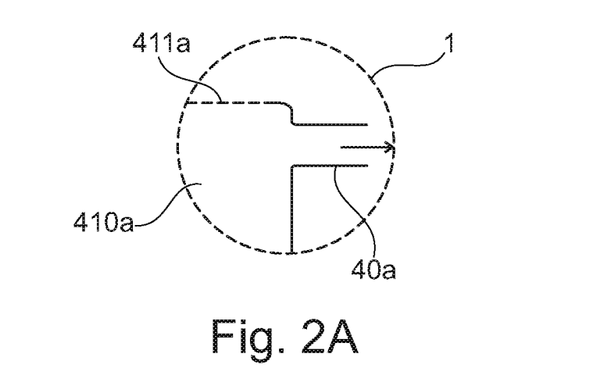
FIGS. 2A-2B show enlarged views of a detail that can be seen in FIG. 2, illustrating two different variants for using the total or static pressure within the valve housing or noise attenuator housing for determining the position of the respective valve device with the aid of the fluid sensor.
Figure 2B:
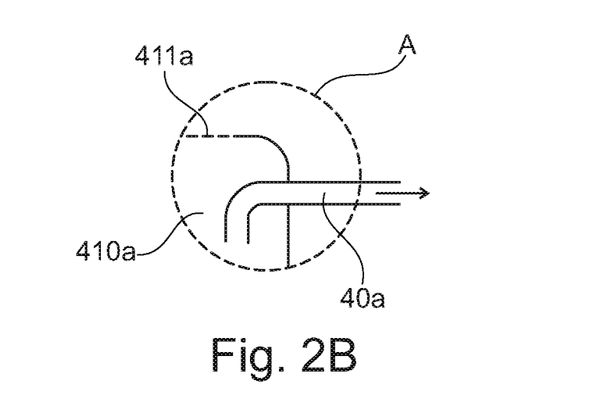

FIGS. 2, 2A and 2B schematically show by way of example for a bleed valve 4a the connection of the associated fluid duct 40a, leading in the direction of the temperature sensor 3, to a valve housing or noise attenuator housing 41a. The valve housing or noise attenuator housing 41a defines a chamber 410a via which the bleed air is passed to an outflow opening 411a of the valve housing or noise attenuator housing 41a when a shut-off member 420a of the bleed valve 4a is open. By means of this outflow opening 411a, the bleed air can be bled off into the bypass duct B. The position of the shut-off member 42a, and consequently of the bleed valve 4a, is controlled by means of a fluid line 420a for control air. The bleed valve 4a, which is consequently controlled by compressed air, is accordingly transferred into an open position by being acted upon by control air from the fluid line 420a counter to a restoring force, which is for example applied by at least one magnet and or a spring.

The fluid line 40a, by means of which a fluid flow is passed to the temperature sensor 3 when the bleed valve 4a is open, is connected to the valve housing or noise attenuator housing 41a. Fluid duct 40a is in this case fluidically in connection with the chamber 410a, so that, with the bleed valve 4a open, bleed air is branched off into the fluid duct 40a, and this branched-off bleed air consequently does not reach the outflow opening 411a.

In a way corresponding to the representations of FIG. 2A or 2B, the fluid line 40a may in this case be fluidically in connection with the chamber 410a in various ways. Thus, the fact that the fluid duct 40a opens out directly into the chamber 410a in a way corresponding to FIG. 2 allows a static pressure to be used for generating the fluid flow in the fluid duct 40a. In the case of the configurational variant of FIG. 2B, on the other hand, the total pressure is decisive. The pressure in the flow space 20 or the region into which the outflow duct of the duct connector 2 opens out is in this case lower than the pressure in the chamber 410a with the shut-off member 42a open.

Figure 3A:
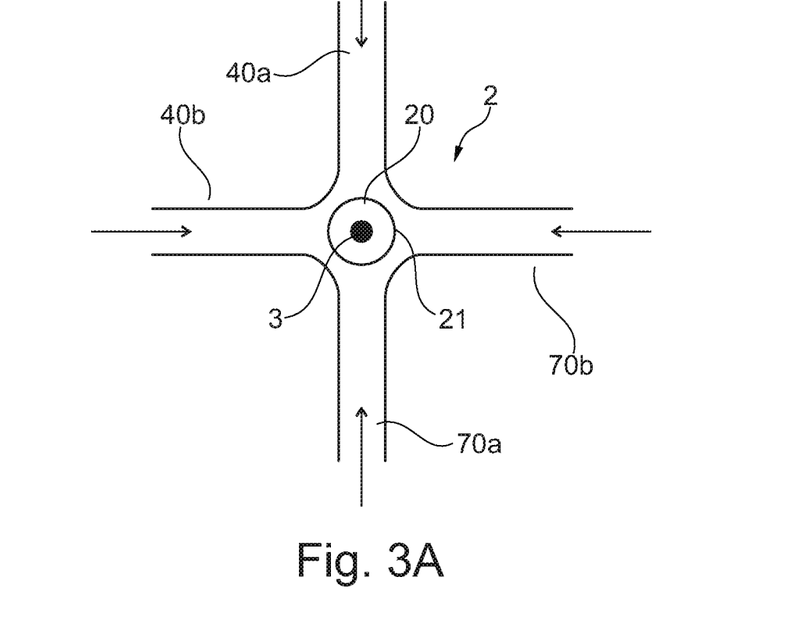
FIG. 3A shows in a sectional view a variant for a duct connector for four fluid ducts of four valve devices in a way corresponding to FIG. 1.
Figure 3B:
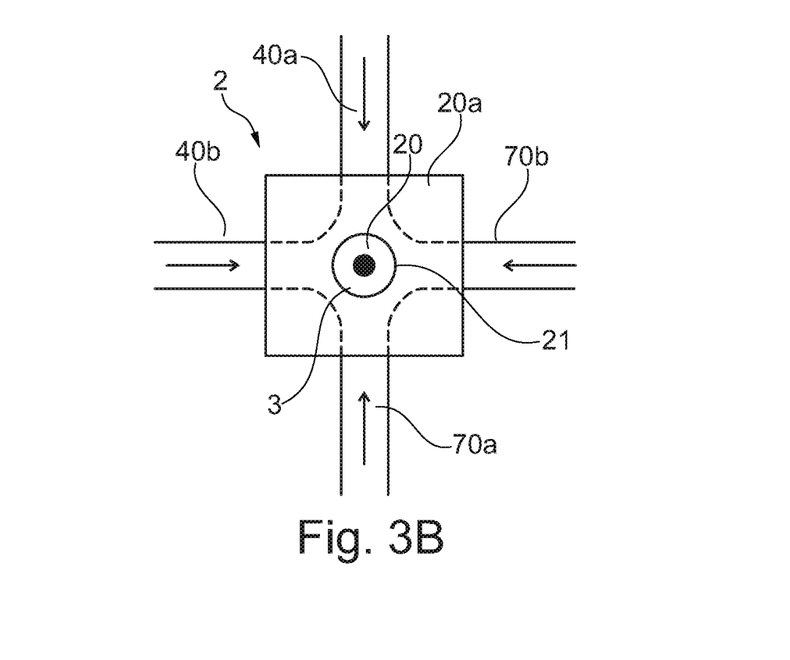
FIG. 3B shows an alternative design of the duct connector from FIG. 3A.
Figure 4A:
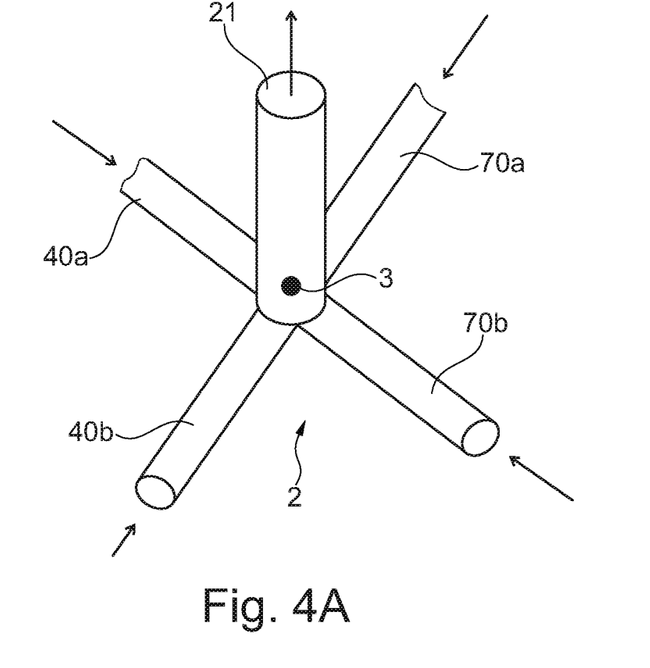
FIG. 4A shows a perspective representation of the duct connector with fluid ducts connected thereby in a way corresponding to FIG. 3A.
Figure 4B:
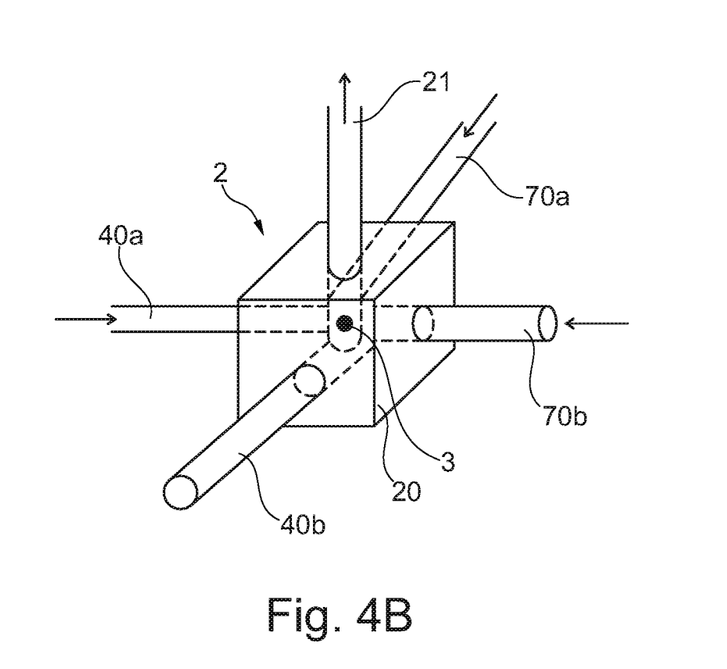
FIG. 4B shows a perspective representation of the duct connector with fluid ducts connected thereby in a way corresponding to FIG. 3B.

FIGS. 3A and 4A as well as 3B and 4B illustrate two different configurational variants for the duct connector 2. The individual fluid ducts 40a, 40b, 70a and 70b of the individual bleed valves 4a, 4b, 7a, 7b respectively open out in a star-shaped manner into the duct connector 2, so that the temperature sensor 3 can be arranged at a crossing point of the fluid flows in the flow space 20 respectively conducted thereby. From this flow space 20, a single outflow duct 21, here of a tubular design, diverts inflowing fluid, for example into the bypass duct B.

In the case of the configurational variant of FIGS. 3A, 4A, the fluid ducts 40a, 40b, 70a, 70b are connected directly to one another and the outflow duct 21. In the case of the configurational variant of FIGS. 3B and 4B, the duct connector additionally has a housing block 2a, in which the flow space 20 is defined. The housing block 2a provides greater robustness and makes the placement of the flow space 20 within the engine T more variable.

Figure 5A:
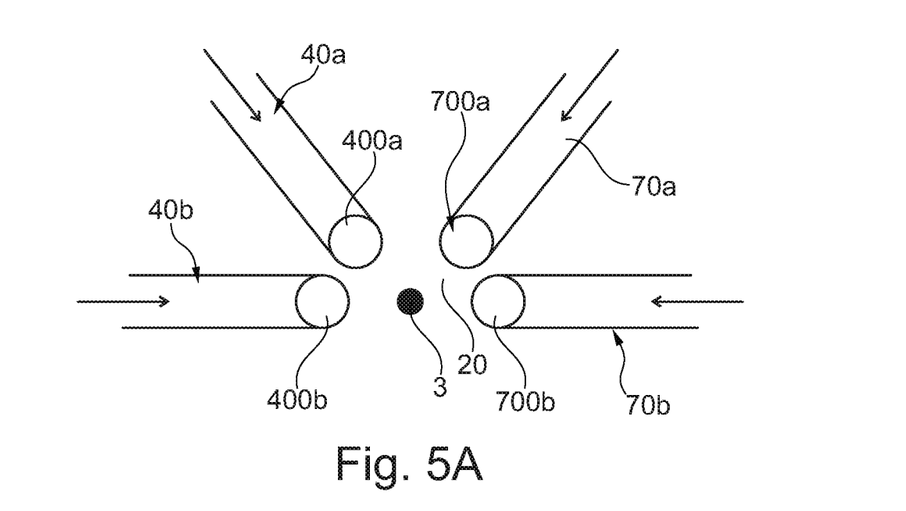
FIG. 5A shows an alternative configuration of a flow space receiving the fluid sensor, into which fluid flows from four fluid ducts for the valve devices from FIG. 1 flow.
Figure 5B:
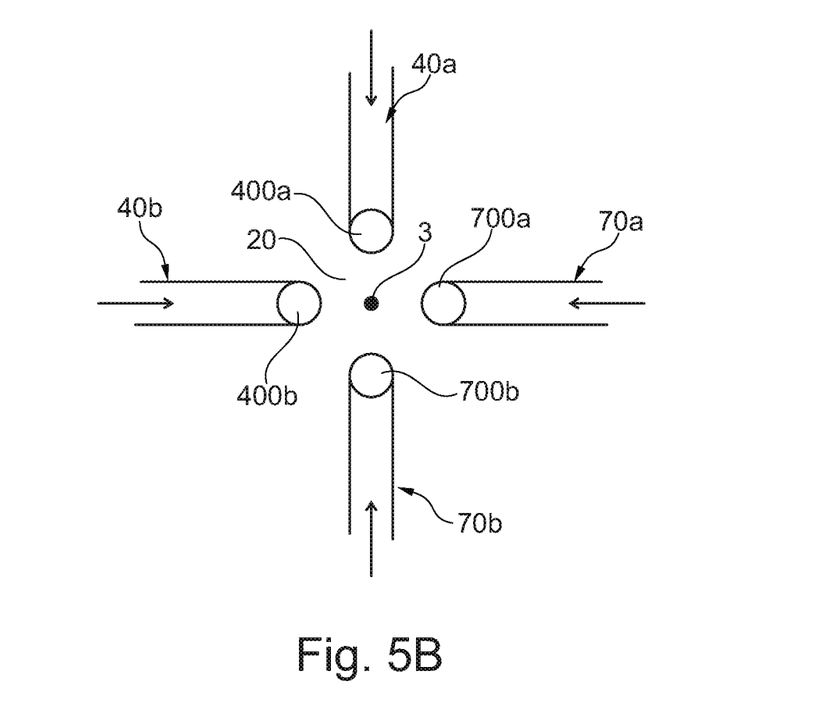
FIG. 5B shows in a view coinciding with FIG. 5A an alternative arrangement of the outlet openings of the fluid ducts.

In the case of the configurational variant of FIGS. 5A and 5B, the temperature sensor 3 is once again at the crossing point of the fluid flows originating from the bleed valves 4a, 4a, 7a and 7b that are generated with the bleed valves 4a, 4b, 7a and 7b open. However, the flow space 20 in which the temperature sensor 3 is arranged is not characterized here by a direct physical connection of the individual fluid ducts 40a, 40b, 70a, 70b. Rather, only exposed flow openings 400a, 400b, 700a, 700b of the fluid ducts 40a, 40b, 70a, 70b open out into the flow space 20, in order thereby to direct outflowing fluid in the direction of the temperature sensor 3. Consequently, there does not have to be a connection of the fluid ducts 40a, 40b, 70a, 70b to one another in order by means of a single temperature sensor 3 to determine positions of the bleed valves 4a, 4b, 7a, 7b indirectly on a sensor basis. Rather, here the individual fluid ducts 40a, 40b, 70a, 70b are arranged with their ends in such a way that each of the fluid flows from these fluid ducts 40a, 40b, 70a, 70b impinges on the temperature sensor 3.

In the case of a corresponding configurational variant, such as that represented by way of example in FIG. 5A or 5B, the temperature sensor 3 can also be used more easily for additional functions, for example in order also to detect a temperature in an adjacent zone of the high-pressure compressor 12. Consequently, for example, the possible failure of a fluid line can also be detected by means of the temperature sensor 3, if for example hotter fluid passes thereby into the open flow space 20.

Figure 6:
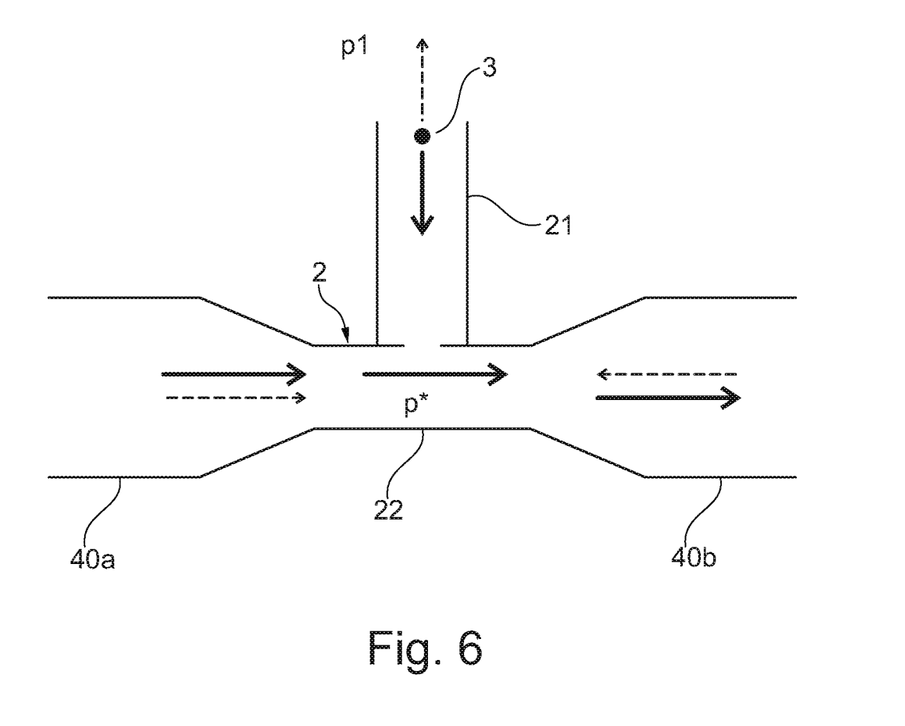
FIG. 6 shows in the form of a detail a connecting duct, formed in the manner of a Venturi tube, for the fluid coupling of two fluid ducts of two valve devices with the arrangement of the fluid sensor in an outflow duct that is fluidically connected to the connecting duct at a constriction of the connecting duct.

In the case of the configurational variant of FIG. 6, by way of example two fluid ducts 40a, 40b of two bleed valves 4a, 4b are connected to one another by means of a connecting duct 22 designed as a Venturi tube. The connecting duct 22 consequently defines a constriction between the two fluid ducts 40a, 40b, which leads to an increase of the flow velocity in the connecting duct 22 or to a lowering/reduction of the static pressure. Connected to the constriction is an outflow duct 21, so that, depending on the pressure difference prevailing, fluid can flow out of the connecting duct 22 via the outflow duct 21 to the outside or from the outside via the outflow duct 21 into the connecting duct 22. The outflow duct 21 in this case opens out into a region with a pressure $p_1$. A pressure $p^*$ present in the constriction of the connecting duct 22 consequently varies, in dependence on which fluid duct 40a, 40b is used for directing branched-off bleed air in the direction of the connecting duct 22. If, for example, the bleed valve 4a with the fluid duct 40a (shown on the left in FIG. 6) is open, while the other bleed valve 4b with its fluid duct 40b (shown on the right) is closed, the pressure p* in the connecting duct 22 is less than the pressure $p_1$. Consequently, fluid flows out of one fluid duct 40a in the direction of the fluid duct 40b of the other bleed valve 4b as well as through the outflow duct 21 in the direction of the connecting duct 22. If, on the other hand, both bleed valves 4a, 4b are open, the pressure p* in the connecting duct 22 exceeds the pressure $p_1$, so that the combined fluid flows from both fluid ducts 40a, 40b flow out through the outflow duct 21.

Consequently, a fluid sensor which is placed in the outflow duct 21 and by means of which for example temperature, pressure and/or flow velocity can be measured, can be used to provide a sensor signal $s_T$, which is indicative of the fluid flow occurring in the outflow duct 21. On account of the chosen configuration, it can then be directly deduced from this whether and how many bleed valves 4a, 4b are open.

In particular, this configurational variant illustrates that the sensor 3 does not necessarily have to be designed as a temperature sensor. In particular, a pressure sensor or a velocity sensor can likewise be readily used within the scope of the proposed solution.

In the case of the configurational variant of FIG. 6, the arrangement of the fluid ducts 40a, 40b and the outflow duct 21 with the fluid sensor 3 accommodated therein may otherwise also be designed such that a significant change of a measured variable, for example the temperature, is only signaled by means of the fluid sensor 3 whenever two (or more) bleed valves 4a, 4b connected to one another by way of their fluid ducts are open. Thus, for example, an alarm signal can only be generated whenever at least two open bleed valves 4a, 4b undesirably allow the bleeding off of bleed air, and consequently an amount of bleed air that is considered to be critical is bled off. Thus, under some circumstances a bleed valve 4a, 4b that is not functioning faultlessly is not considered to be critical, so that the measurement-based evaluation can be restricted to the cases where an open position of a number of bleed valves 4a, 4b that is attributable to a fault is established by means of the fluid sensor 3.

LIST OF REFERENCE SIGNS

1 Casing
11 Low-pressure compressor
110 Rotor blade
111 Stator vane
12 High-pressure compressor
120 Casing section of high-pressure compressor
13 High-pressure turbine
14 Medium-pressure turbine
15 Low-pressure turbine
2 Duct connector
20 Flow space
21 Flow space/outflow duct
22 Connecting duct
2a Housing block
3 Temperature/pressure sensor
4 Electronic control system
4a, 4b, 4c Bleed valve (valve device)
40a, 40b Fluid duct
400a, 400b Outlet opening
410a Chamber
411a Outflow opening
41a Valve/noise attenuator housing
420a Fluid line
42a Shut-off member
7a, 7b Bleed valve (valve device)
70a, 70b Fluid duct
700a, 700b Outlet opening
A Outlet
B Bypass duct
BK Combustion chamber section
D Axis of rotation/spindle axis
E Inlet/Intake
F Fan
L Longitudinal axis
M Central axis/axis of rotation
p* Pressure
$p_1$ Pressure
R Inlet direction
$s_T$ Sensor signal
$s_{4a}, s_{4b}, s_{7a}, s_{7b}$ Actuating signal
T Gas turbine engine
TT Turbine
V Compressor

The invention claimed is:

1. An engine, comprising:
   at least two valve devices for controlling bleed air in dependence on an operating state of the engine, the at least two valve devices each being adjustable between an open position and a closed position,
   a flow space confining at least one fluid flow established by fluid flowing from the at least two valve devices, the at least one fluid flow determined by respective positions of the at least two valve devices,
   a fluid sensor arranged in the flow space and configured to sense the at least one fluid flow, and
   an electronic control system configured to determine, based on the sensing of the at least one fluid flow, the position of at least one of the at least two valve devices;
   wherein the at least one fluid flow includes at least two different fluid flows generated by different valve devices of the at least two valve devices and flowing into and/or through the flow space;
   wherein the at least two different fluid flows are all directed to impinge on the fluid sensor.

2. The engine according to claim 1, wherein the flow space is configured such that the at least one fluid flow flows into and/or through the flow space when at least one of the at least two valve devices is at least partially open.

3. The engine according to claim 1, and further comprising:
   an outflow opening configured to receive a flow of bleed air generated by one of the at least two valve devices, and
   at least one fluid duct configured to conduct the at least one fluid flow to the flow space, the at least one fluid duct also configured so as to not conduct the at least one fluid flow to the outflow opening.

4. The engine according to claim 3, wherein bleed air that is at least partially branched off from the flow in a direction of the outflow opening by the at least one fluid generates the at least one fluid flow and is conducted not to the outflow opening, but to the flow space.

5. The engine according to claim 3, wherein at least one of the at least two valve devices includes a housing including the at least one fluid duct and the outflow opening.

6. The engine according to claim 1, wherein the flow space is provided at a crossing point of the at least two different fluid flows.

7. The engine according to claim 6, wherein the fluid sensor is arranged at the crossing point.

8. The engine according to claim 6, and further comprising a duct connector, wherein the at least one fluid duct includes at least two fluid ducts and wherein the crossing point is in the duct connector, the duct connector connecting the at least two fluid ducts that conduct respectively the at least two different fluid flows.

9. The engine according to claim 8, wherein the duct connector includes an outflow duct having the outflow opening, the duct connector connecting the at least two fluid ducts to the outflow duct such that at least some of the fluid conducted to the flow space flows out of the flow space via the outflow duct.

10. The engine according to claim 6, wherein the crossing point is positioned between at least two outlet openings respectively of at least two fluid ducts that conduct respectively the at least two different fluid flows.

11. The engine according to one of claim 1, and further comprising a connecting duct connecting the at least two fluid ducts to one another, wherein the fluid sensor in the flow space is at a distance from the connecting duct.

12. The engine according to claim 11, wherein the connecting duct includes a Venturi tube.

13. The engine according to claim 11, and further comprising an outflow duct connected to the connecting duct, and wherein the flow space is formed by the outflow duct connected to the connecting duct.

14. The engine according to one of claim 11, wherein the at least one flow space and the fluid sensor are arranged in such a way that, in dependence on a number of the at least two valve devices that are at least partially open, fluid flows past the fluid sensor in flow directions that are different from one another.

15. The engine according to claim 1, the electronic control system configured to process actuating signals independent of the fluid sensor and indicative of a position of at least one of the at least two valve devices.

16. The engine according to claim 1, wherein the at least two valve devices are connected to a compressor of the engine and configured to control bleed air at the compressor.

17. The engine according to claim 16, wherein a first valve device and a second valve device of the at least two valve devices are connected to different compressor stages of the compressor, so that by the fluid sensor sensing the at least two different fluid flows respectively from the first and second valve devices, the positions of the first and second valve devices is determined.

18. The engine according to claim 1, and further comprising an outflow opening connected to the flow space, wherein the at least two different fluid flows generated by different valve devices of the at least two valve devices includes three fluid flows generated by three valve devices, at least one of the three fluid flows being directed to the outflow opening and at least another of the fluid flows being directed to not flow to the outflow opening.

19. A method for testing a functioning of at least two valve devices for controlling bleed air in dependence on an operating state of an engine, the at least two valve devices in each case being adjustable between an open position and a closed position,
- providing a flow space for at least one fluid flow occurring in dependence on a position of at least one of the at least two valve devices,
- providing that the at least one fluid flow includes at least two different fluid flows generated by different valve devices of the at least two valve devices and flowing into and/or through the flow space;
- providing a fluid sensor in the flow space;
- directing all of the at least two different fluid flows to impinge on the fluid sensor;
- providing that the fluid sensor generates a sensor signal indicative of at least one position of at least one of the at least two valve devices; and
- determining, based on the sensor signal, the at least one position of the at least one of the at least two valve devices.

* * * * *